Figure 8:
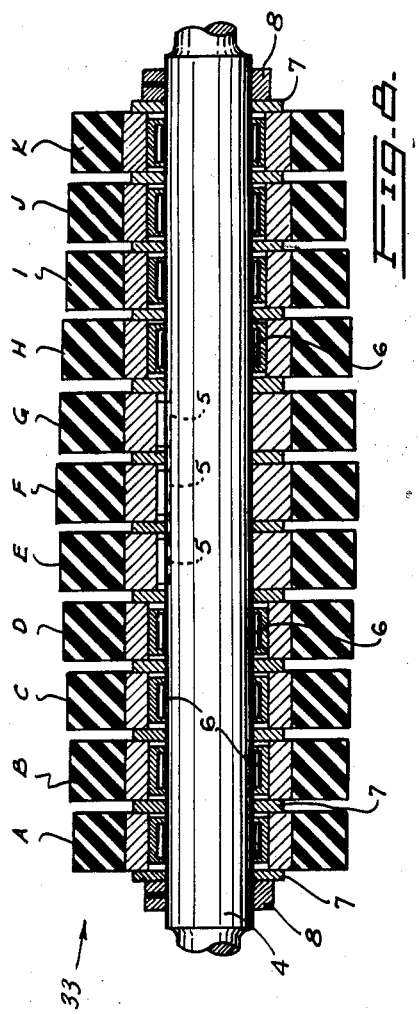

Aug. 9, 1960 R. E. RICHARDSON 2,948,646
GLASS PRESSING NIPPER ROLLS
Filed March 23, 1956 5 Sheets-Sheet 1
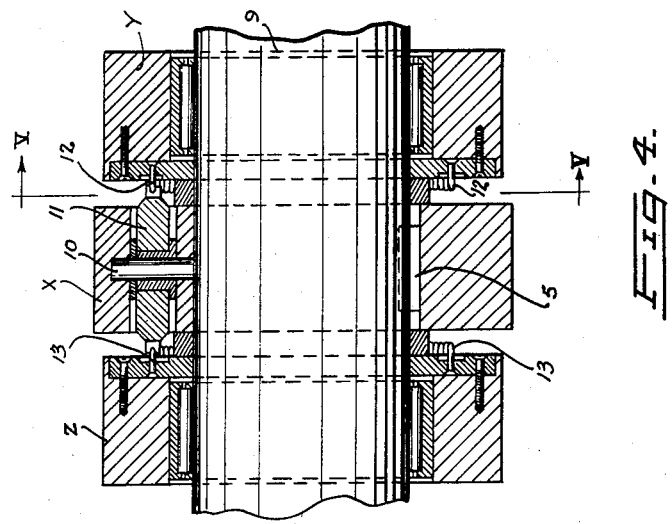
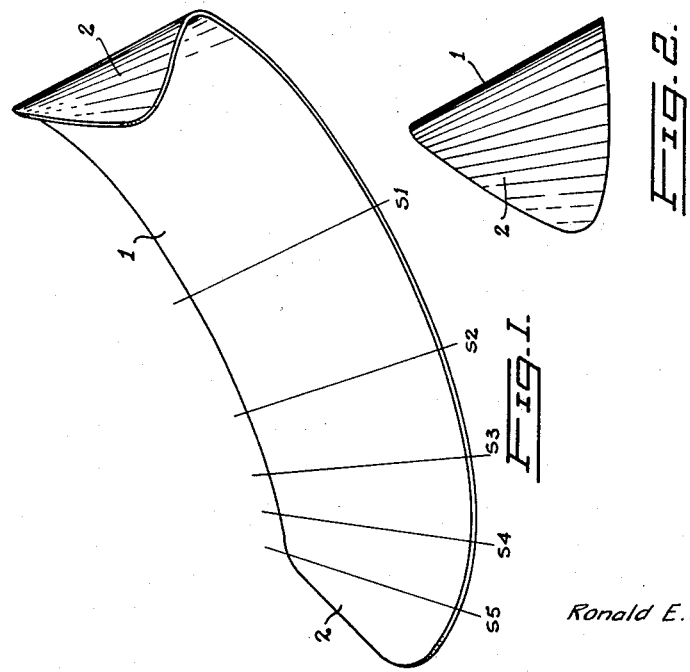
INVENTOR
Ronald E. Richardson

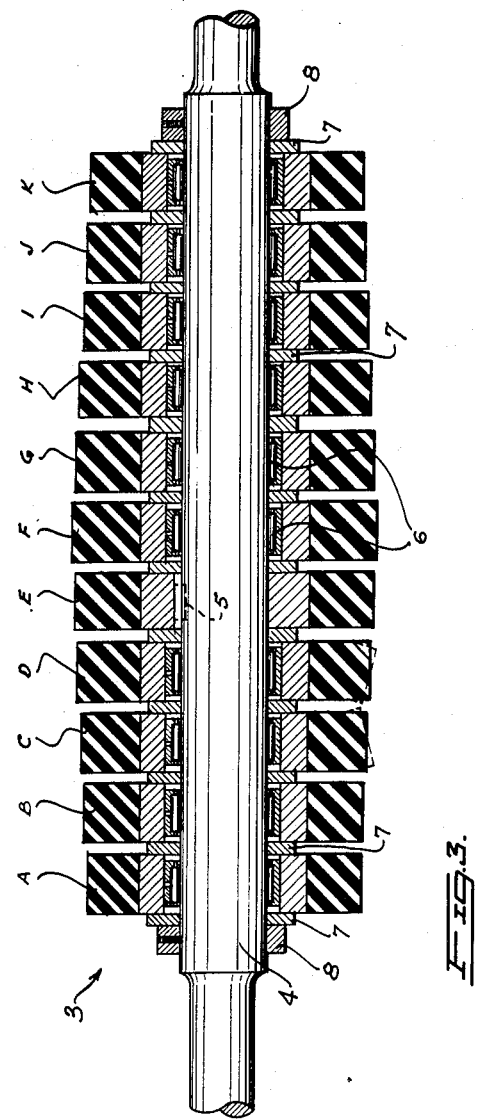

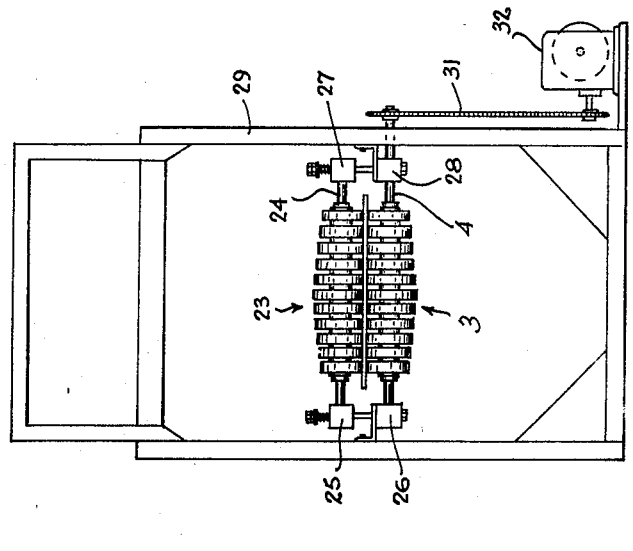
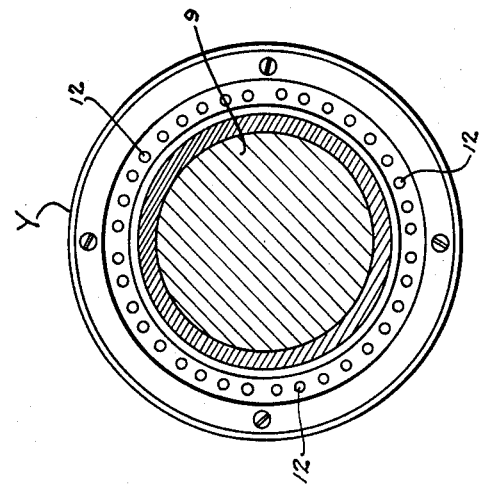

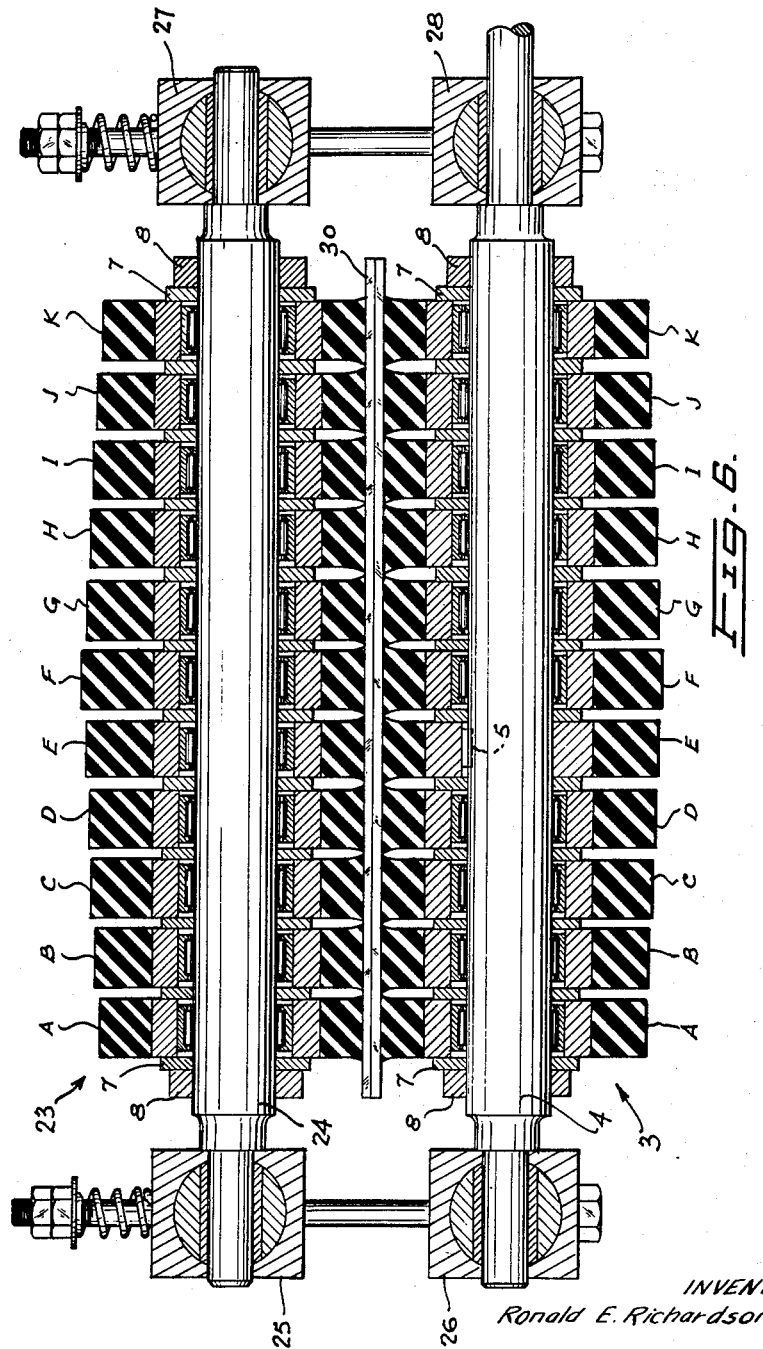

Aug. 9, 1960

R. E. RICHARDSON 2,948,646

GLASS PRESSING NIPPER ROLLS

Filed March 23, 1956

5 Sheets-Sheet 5

INVENTOR
Ronald E. Richardson

United States Patent Office 2,948,646
Patented Aug. 9, 1960

2,948,646

GLASS PRESSING NIPPER ROLLS

Ronald E. Richardson, Oshawa, Ontario, Canada, assignor, by mesne assignments, to Pittsburgh Plate Glass Company, Pittsburgh, Pa.

Filed Mar. 23, 1956, Ser. No. 573,518

Claims priority, application Canada Apr. 12, 1955

10 Claims. (Cl. 154—2.7)

This invention relates to improvements in nipper rolls that are employed in the preliminary pressing of laminated safety glass. By far the greatest single use for this safety glass is in the manufacture of windshields and other automobile windows. The modern trend in the design of automobile rear windows and windshields is towards the so-called "wrap-around" type in which the glass is in the form of an elongated sheet, the central portion of which has a gentle curvature while the radius of curvature is sharply reduced at each end until the glass is extending almost perpendicular to the main body of the sheet.

A preliminary pressing of the laminated sheets by nipper rolls is an essential step in the manufacture of safety glass and takes place prior to the final pressing and sealing step which is effected in air or under water or oil in an autoclave. Attempts to press windshields of the "wrap-around" type in existing presses having conventional nipper rolls has lead to a large instance of breakage, even up to 30% at times. Methods in which different parts of the sheet are pressed in separate individual stages by narrow rolls arranged on separate pairs of shafts, have been tried in the past, but with no great success. It is economically highly desirable to press the full width of the glass simultaneously. The object of the present invention is to provide improvements in the construction of nipper rolls that will enable the high pressures exerted by such rolls to be applied safely and simultaneously to the full width of glass sheets having small radii of curvature in some areas, such as "wrap-around" windshields and the like.

The shape of "wrap-around" windshields currently in use is such that there is at all positions along the windshield a transverse straight line which actually touches or very nearly touches the concave surface of the glass at all points across its width. (Similarly a parallel straight line would touch or essentially touch the convex surface of the glass, since the two surfaces are uniformly equi-distant from one another at all points. The concave surface will be considered merely for convenience of explaining the invention.) In other words, the windshield has no true transverse curvature. On the other hand, the radii of curvature of the two edges of the windshield are not the same, so that the various straight lines that could be drawn touching the concave surface of the glass will not be parallel with one another.

For further elucidation of the shape of "wrap-around" windshields, reference should be made to Figures 1 and 2 of the accompanying drawings, which show such a windshield in perspective and end elevation respectively.

The accompanying drawings also include Figure 3 which is a central longitudinal section of a nipper roll constructed in accordance with the present invention, and Figure 4 which shows a fragment of a modified form of nipper roll according to the invention.

Figure 5 is a view taken on the line V—V in Figure 4; Figure 6 is a view of a pair of nipper rolls each similar to the one seen in Figure 3 and mounted in a nipper roll press; Figure 7 is a general overall view of a nipper roll press; and Figure 8 is a view similar to Figure 3 showing a variant.

A description of these rolls will be furnished below, following the present considerations regarding the shape of "wrap-around" windshields.

A "wrap-around' windshield 1, as shown in Figures 1 and 2, has sharply turned-back ends 2. A number of lines S1, S2, S3, S4 and S5 drawn to touch the concave surface of the windshield at all points thereacross, in the manner referred to above, are also shown in this view. The first line S1 is located centrally of the windshield, and the other lines S2 etc. are spaced out towards one end thereof. The progressive inclination of these latter lines to the line S1 as the distance from such line increases, is evident from Figure 1.

Provided the windshield is passed between the nipper rolls so that the straight lines S1 to S5 on the glass each lie momentarily entirely in the plane defined by the axes of the rolls as the glass passes between the rolls, the high compressive force exerted by the rolls will act properly to force the laminations together in the required manner, and there will be little or no tendency for the glass to be cracked. The more the axes of the rolls fail to be aligned with a straight line that touches the surface of the glass uninterruptedly, the more there will be a twisting stress exerted on the glass tending to crack it. This has been the reason for the large number of failures experienced with conventional cylindrical nipper rolls.

The object of the present invention is to provide for feeding the glass through the rolls in such a manner as to permit maintenance as far as possible of the required alignment between the straight lines on the glass and the roll axes.

To this end, each roll, or at least the driven roll, is divided transversely to the longitudinal axis into at least two and preferably a substantially larger number of separate sections or narrow coaxial rolls mounted on said shaft for rotation independently of each other. One or more will be positively driven and some will be formed as idling rolls. Nipper rolls constructed according to the present invention are designed to provide a structure more convenient to the operator in that the glass may more readily be swung transversely to keep the straight line on the glass consistently aligned with the axes of the rolls.

Referring now to Figure 3, a typical lower, i.e. driven, nipper roll 3 is shown as divided into a number of separate and comparatively widely spaced narrow sections A to K, each consisting of an inner metal base to which is secured an annular rubber surround. Only one of the sections, the section E having been chosen for illustration, is driven positively by the central shaft 4 to which its metal base is keyed by a key 5. All the other sections are shown as free to rotate independently around the shaft 4 on roller bearings 6. Bronze spacers 7 serve to maintain the required spacing between sections, being held in place at each end of the roll by collars 8 secured to the shaft 4.

If a curved glass sheet 30 is passed between this composite roll 3 and a complementary upper roll 23 (Figure 6) which will conveniently be similarly divided into a number of narrow sections A to K all of which are free to rotate independently of one another on a fixed shaft 24, only the section E of roll 3 will exert a positive driving force on the glass. All the other sections in both rolls 3 and 23 in contact with the glass 30 will be carried around by transfer of power from the glass to such sections by virtue of the friction produced by the high pressure exerted on the nipper rolls by the press. Such an arrangement will make it very easy for the operator to swing the glass one way or another to follow the straight line on the glass surface as the inclination of such line varies with the movement of the glass between the rolls. Figure 6 shows how the shafts 4 and 24 of rolls 3 and 23 are mounted in bearings 25, 26, 27 and 28. This manner of mounting nipper rolls in a nipper roll press is conventional and is also shown diagrammatically in the overall view of Figure 7 which illustrates a nipper roll press 29 in general outline and shows the manner in which the lower shaft 4 is driven through chain drive 31 from a power source 32.

Various different arrangements for the driving and idling rolls have been tried and have been found satisfactory to varying degrees for other glass shapes. An arrangement by which the three centre sections of a lower roll 33, i.e. sections E, F and G of the roll illustrated in Figure 8, are positively driven by the shaft 4 while the remaining sections on each side of these three centre sections are arranged to idle, has been found satisfactory for rolling "wrap-around" windshields. Nonetheless, this arrangement still relies to some extent on the operator to twist the glass sheet, although it facilitates his carrying out this operation and has some tendency to be self-aligning.

If it is desired positively to ensure such twisting of the glass, the sections making up the roll may be positively driven at different speeds. For example, one section, or one group of sections, at one end of the roll may be driven by a separate shaft at a slightly faster speed than the section or group of sections at the other end of the roll. This would then produce an effect somewhat similar to that obtained by the provision of a conical aspect on the rolls as described in the present applicant's co-pending United States application Serial No. 573,519, filed March 23, 1956.

Figures 4 and 5 illustrate a further refinement that may be incorporated into sectionalized rolls of this type. Figure 4 shows the central portion of a roll section X which is positively driven by a shaft 9 through a key 5. This roll section X carries a spindle 10 on which is freely mounted a spur pinion 11 meshing at each end of the section with annular racks 12 and 13 secured to the end faces of respective adjacent roll sections Y and Z. This system operates in the manner of a differential gear. The centre section X tends to drive the adjacent sections Y and Z both at the same speed as itself, but, if additional resistance to motion is encountered by one of the outer sections, such section will slow down somewhat and the section on the other side of the central one will increase its speed correspondingly. In other words the average speed of the two outside sections will be the same as the speed of the central section.

It is anticipated that two or more sets of such differentially connected sections may be provided along the length of the roll. The driven central sections of each set may be driven at the same speed as one another, or at different controlled speeds, or they may themselves, if there are three sets, be connected together in a differential manner so that the average speed of the outer sets is equal to the speed of the central set.

With the glasses presently in use in the automotive industry, there is normally no transverse curvature, as has been explained above. However, it is anticipated that there may in the future be a call for glasses with transverse curvature. If a glass sheet were to be rolled with a transverse curvature, a nipper roll press according to the present invention would be admirably suited to perform such operation, since, if the transverse curvature were ununiform along the length of such sheet, it would be readily practicable to vary the speed of rotation of one or more sections of the roll in accordance with the portion of the glass sheet under treatment. Virtually any speed variation can be achieved by providing separate drives to two or more sections, or groups of sections of the driven roll, and controlling these drives by means such as cams whereby any desired variation of the speed with time is obtainable no matter how asymmetrical such variation may be.

By one or other of the foregoing expedients the various sections of the roll can be equipped to take care of the various changes in speed that they will be required to undergo in rolling a complex curved glass surface, the need for the rolls to slip over the glass surface and thus the need for the operator to exert any large force against the glass sheet to feed it through the rolls in the optimum manner (i.e. with the straight line always parallel with the roll axes) being minimized and, in many cases, wholly eliminated.

In addition to the features of the present invention described above, the various sections of the roll may be of varied diameter so as to provide rolls having conical or hump aspects such as described in said co-pending application, or complementary male and female aspects to provide for transverse curvature of the glass, such aspects being employed either individually or in any combination, thus providing further variables that may be controlled to provide for the more complex curved glass surfaces that the industry may be called upon to roll in the future. The roll 3 seen in Figure 3 is provided with a hump aspect to illustrate one of these possibilities.

A valuable advantage of the present sectionalized construction of the roll resides in the local freedom that it imparts to the rubber on the roll surface. How the surface rubber may yield laterally to accommodate a local projection or recess on the glass surface, is demonstrated by the broken lines added to the lower parts of sections C and D of the roll 3 seen in Figure 3. No comparable effect can be obtained with a solidly constructed roll.

An ancillary advantage of the sectionalized construction of nipper rolls according to the present invention, is that certain sections can readily be made of different hardness from other sections. It is preferred to use softer rubber in the outer sections, i.e, near the ends of the rolls, than in the central sections.

I claim:

1. In a nipper roll press for the preliminary pressing of curved laminated glass sheets, a pair of upper and lower resilient nipper rolls, a pair of shafts for mounting said rolls, bearing means for supporting said shafts with their longitudinal axes maintained always in a common plane, means pressing said rolls tightly together, and means for driving one of said shafts, the nipper roll mounted on the driven shaft being divided transversely to the longitudinal axis of said roll into at least two coaxial sections, at least one of said sections being keyed to said driven shaft to rotate therewith, and at least one of said sections being free to rotate around said shaft independently of the rotation and of the spatial position thereof.

2. In a nipper roll press for the preliminary pressing of curved laminated glass sheets, a pair of upper and lower resilient nipper rolls, a pair of shafts for mounting said rolls, bearing means for supporting said shafts with their longitudinal axes maintained always in a common plane, means pressing said rolls tightly together, and means for driving one of said shafts, each said nipper roll being divided transversely to the longitudinal axis of said roll into at least two coaxial sections mounted on the respective shaft for rotation independently of each other and independently of the spatial position of the respective shaft, at least one of said sections of the roll mounted on the driven shaft being keyed to said driven shaft to rotate therewith.

3. A nipper roll press as claimed in claim 2, wherein at least one of said sections of the roll mounted on the driven shaft is free to rotate around said shaft independently thereof, and wherein all the sections of the roll mounted on the other said shaft are free to rotate around said latter shaft independently thereof and of one another.

4. In a nipper roll press for the preliminary pressing of curved laminated glass sheets, a pair of upper and lower resilient nipper rolls, a pair of shafts for mounting said rolls, bearing means for supporting said shafts with their longitudinal axes maintained always in a common plane, means pressing said rolls tightly together, and means for driving one of said shafts, the nipper roll mounted on the driven shaft being divided transversely to the longitudinal axis of said roll into a series of at least three longitudinally relatively short coaxial sections mounted on said shaft for rotation each independently of all others, at least a selected one of said sections situated longitudinally generally centrally of the roll mounted on the driven shaft being keyed to said driven shaft to rotate therewith.

5. A nipper roll press as claimed in claim 4, wherein at least one section adjacent said selected section is also keyed to said driven shaft to rotate therewith.

6. A nipper roll press as claimed in claim 4, wherein three of the sections of the roll mounted on the driven shaft are connected together differentially so that the average speed of two of said sections will always equal the speed of the third said section, said third section being keyed to said shaft to rotate therewith.

7. In a nipper roll press for the preliminary pressing of curved laminated glass sheets, a pair of upper and lower resilient nipper rolls and a pair of shafts for mounting said rolls, bearing means for supporting said shafts with their longitudinal axes maintained always in a common plane, means pressing said rolls tightly together, and means for driving one of said shafts, the nipper roll mounted on the driven shaft being divided transversely to the longitudinal axis of said roll into a series of at least three longitudinally relatively short, spaced-apart, coaxial sections, at least a selected one of said sections situated longitudinally generally centrally of said roll mounted on the driven shaft being keyed to said driven shaft to rotate therewith, the remainder of said sections being free to rotate around said driven shaft independently thereof and of one another.

8. A nipper roll press as claimed in claim 7, wherein the nipper roll mounted on the other shaft is also divided transversely to its longitudinal axis into a series of longitudinally relatively short, spaced-apart, coaxial sections, all such last-mentioned sections being mounted on said other shaft so as to be free to rotate around said other shaft independently thereof and of one another.

9. In a nipper roll press for the preliminary pressing of curved laminated glass sheets, a pair of upper and lower resilient nipper rolls, a pair of shafts for mounting said rolls, bearing means for supporting said shafts with their longitudinal axes maintained always in a common plane, means pressing said rolls tightly together, and means for driving one of said shafts, the nipper roll mounted on the driven shaft being divided transversely to the longitudinal axis of said roll into at least two coaxial sections, at least one of said sections being keyed to said driven shaft to rotate therewith, and at least one of said sections being free to rotate around said shaft independently of the rotation and of the spatial position thereof, the diameter of each of said rolls increasing from each end longitudinally towards the centre of the roll to provide said roll with a hump aspect.

10. In a nipper roll press for the preliminary pressing of curved laminated glass sheets, a pair of upper and lower resilient nipper rolls, a first shaft for mounting a first one of said rolls, a pair of coaxial shafts for mounting the second of said rolls, said coaxial shafts being mounted to rotate freely relative to one another, first bearing means for supporting said first shaft, second bearing means for supporting said pair of coaxial shafts, means for urging said rolls together, first driving means for driving one of said coaxial shafts supporting said second roll, and second driving means for driving the other of said coaxial shafts supporting said second roll, said second roll being divided transversely to its longitudinal axis into at least two coaxial sections, at least one of said sections being keyed to said first coaxial shaft and at least one other of said sections being keyed to said second coaxial shaft.

References Cited in the file of this patent

UNITED STATES PATENTS

| | | |
|---|---|---|
| 492,613 | Pierce | Feb. 28, 1893 |
| 530,421 | Judd | Dec. 4, 1894 |
| 994,910 | Duesterhoff | June 13, 1911 |
| 2,231,857 | Delacuvellerie | Feb. 11, 1941 |
| 2,593,157 | Lorig | Apr. 15, 1952 |
| 2,628,177 | Boicey et al. | Feb. 10, 1953 |
| 2,635,973 | Swindler | Apr. 21, 1953 |
| 2,650,603 | Howes | Sept. 1, 1953 |
| 2,701,430 | Lorig | Feb. 8, 1955 |